(12) United States Patent
Bradley et al.

(10) Patent No.: US 10,298,536 B2
(45) Date of Patent: May 21, 2019

(54) BUILDING OR ENHANCING A RELATIONSHIP BETWEEN USERS OF A COMMUNICATIONS NETWORK

(71) Applicant: International Business Machines Corporation, Armonk, NY (US)

(72) Inventors: Lisa M. W. Bradley, Cary, NC (US); Brian O'Donovan, Dublin (IE); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/081,121

(22) Filed: Mar. 25, 2016

(65) Prior Publication Data

US 2016/0277352 A1    Sep. 22, 2016

Related U.S. Application Data (63) Continuation of application No. 14/660,085, filed on Mar. 17, 2015.

(51) Int. Cl.
*G06Q 50/00* (2012.01)
*H04L 12/58* (2006.01)

(52) U.S. Cl.
CPC .......... *H04L 51/32* (2013.01); *G06Q 50/01* (2013.01)

(58) Field of Classification Search
CPC ......... H04L 51/32; H04L 51/36; H04L 67/22; H04L 67/306; H04L 51/00; G06Q 50/01; G06F 17/30867; G06F 11/3438; G06F 17/30029; H04W 4/21
See application file for complete search history.

(56) References Cited

U.S. PATENT DOCUMENTS

| 8,682,971 | B2 | 3/2014 | Farrell et al. |
| 9,998,796 | B1* | 6/2018 | Kedenburg, III .... H04N 21/482 |
| 2002/0116466 | A1 | 8/2002 | Trevithick et al. |

(Continued)

FOREIGN PATENT DOCUMENTS

CN         103475717 A     12/2013

OTHER PUBLICATIONS

International Business Machines Corporation, "List of IBM Patents or Patent Applications Treated as Related," submitted Mar. 28, 2016, 2 Pages.

(Continued)

*Primary Examiner* — Sargon N Nano
(74) *Attorney, Agent, or Firm* — Peter B. Stewart; Moore & Van Allen PLLC (57) ABSTRACT

A method for building or enhancing a relationship between user A and user C may include receiving an identification of user C of a communications network with whom user A of the communications network wants to build or enhance a relationship. The method may also include receiving an identification of an existing relationship that user A wants to use as a model for building or enhancing the relationship with user C. The method may additionally include developing the model for building or enhancing the relationship with user C based on the existing relationship. The method may further include using the model for building or enhancing the relationship between user A and user C.

16 Claims, 6 Drawing Sheets

(56) References Cited

U.S. PATENT DOCUMENTS

| | | | |
|---|---|---|---|
| 2010/0318571 A1* | 12/2010 | Pearlman | H04L 63/104 707/784 |
| 2011/0288917 A1* | 11/2011 | Wanek | G06Q 30/00 705/14.5 |
| 2012/0191584 A1 | 7/2012 | Blount et al. | |
| 2012/0191594 A1* | 7/2012 | Welch | G06Q 40/02 705/38 |
| 2012/0271722 A1 | 10/2012 | Juan et al. | |
| 2013/0101100 A1* | 4/2013 | Pradeep | H04M 15/04 379/114.1 |
| 2013/0151632 A1* | 6/2013 | Chodavarapu | G06Q 50/01 709/206 |
| 2013/0212173 A1* | 8/2013 | Carthcart | G06Q 50/01 709/204 |
| 2013/0311470 A1 | 11/2013 | Lotfi | |
| 2014/0032273 A1* | 1/2014 | D'Angelo | G06Q 30/02 705/7.35 |
| 2014/0214824 A1* | 7/2014 | Mai | G06F 17/30657 707/731 |
| 2014/0229862 A1 | 8/2014 | St. Clair | |
| 2014/0316784 A1* | 10/2014 | Bradford | G10L 15/18 704/245 |
| 2015/0052070 A1* | 2/2015 | Chen | H04L 51/32 705/319 |
| 2016/0205105 A1* | 7/2016 | Nainwal | H04L 63/101 726/28 |
| 2017/0039278 A1* | 2/2017 | Marra | G06F 17/30861 |
| 2017/0264584 A1* | 9/2017 | Chatterjee | H04L 51/32 |
| 2018/0033095 A1* | 2/2018 | Ocean | G06F 17/30029 |
| 2018/0054410 A1* | 2/2018 | Bhagwan | H04L 51/32 |

OTHER PUBLICATIONS

Anonymously Disclosed; Ttl: Automatic Grouping Based on Proximity; Feb. 22, 2011; Database: ip.com; ip.com No. IPCOM000204383D, 2 pages.

* cited by examiner

TARGET AND STATUS TOWARD TARGET

| 402 | 404 | 406 | 408 | 410 |
|---|---|---|---|---|
| INTERACTION TYPE | TARGET | USER C | USER B | USER D |
| E-MAIL | 10/MONTH | 8/MONTH | 15/MONTH | 10/MONTH |
| SHARE CONTENT | 3/MONTH | 1/MONTH | 3/MONTH | 2/MONTH |
| IN PERSON MEETING | 1/MONTH | 0/MONTH | 1/MONTH | 0/MONTH |
| OTHER | 3/MONTH | 2/MONTH | 4/MONTH | 1/MONTH |

BUILDING OR ENHANCING A RELATIONSHIP BETWEEN USERS OF A COMMUNICATIONS NETWORK

BACKGROUND

Aspects of the present invention relate to communications networks, social networks, message boards, online mail clients and the like, and more particularly to a method, system and computer program product for building or enhancing a relationship between users of a communications network or medium.

There are occasions when a person may desire to create a better or enhanced relationship with another person but may be unsure of the best way for accomplishing this. Both people may be users of some of the same communications media. For example, a user may have a goal to increase the level of interaction with certain other users of particular communications media but is unsure how to go about it. There currently is no mechanism to facilitate a user building or enhancing a relationship with a selected other user of a particular communications medium. Social media, such as LinkedIn, provide a path of extended connection in order to reach a specific user of the service. If a user desires, they can make connections with the other users on the path in order to eventually contact the desired user. However, there is no mechanism to facilitate building or enhancing a relationship with a particular user when a connection already exists between the user wanting to build or enhance the relationship and the other user. LinkedIn is a trademark of LinkedIn Ltd. in the United States, other countries or both.

Some social media may also provide features for determining what other users in a network may like so that particular content that is liked may be shared between users. However, there is no mechanism or arrangement to ensure that the level of interaction matches an appropriate frequency. For example, some users may be annoyed if they are flooded with a large number of interactions from a relative stranger or another user they do not know that well. Today, a user wanting to build or enhance a relationship with another user has no guidance, mechanism or model for doing so. Effectively and efficiently determining the appropriate interactions for building or enhancing a relationship can present insurmountable challenges. For example, there is no system or process for determining the appropriate type of communications to send, over what communications media and with what frequency to effectively build or enhance a relationship by one user with another selected user.

BRIEF SUMMARY

According to one embodiment of the present invention, a method for building or enhancing a relationship between user A and user C may include receiving an identification of user C of a communications network with whom user A of the communications network wants to build or enhance a relationship. The method may also include receiving an identification of an existing relationship that user A wants to use as a model for building or enhancing the relationship with user C. The method may additionally include developing the model for building or enhancing the relationship with user C based on the existing relationship. The method may further include using the model for building or enhancing the relationship between user A and user C. Therefore, an advantage of the method is that a mechanism or model is provided for building or enhancing a relationship between user A and user C that is based on an existing relationship to avoid the disadvantages or problems discussed above. The model may provide the appropriate type and frequency of communications or interactions to build or enhance the relationship.

A system for building or enhancing a relationship between user A and user C may include a processor and a module operating on the processor for building or enhancing the relationship between user A and user C. The module may be configured to perform a set of functions that may include receiving an identification of user C of a communications network with whom user A of the communications network wants to build or enhance a relationship. The set of functions may also include receiving an identification of an existing relationship that user A wants to use as a model for building or enhancing the relationship with user C. The set of functions may additionally include developing the model for building or enhancing the relationship with user C based on the existing relationship. The set of functions may further include using the model for building or enhancing the relationship between user A and user C.

According to another embodiment of the present invention, a computer program product for building or enhancing a relationship between user A and user C may include a computer readable storage medium having program instructions embodied therewith. The computer readable storage medium is not a transitory medium per se. The program instructions are executable by a device to cause the device to perform a method that may include receiving an identification of user C of a communications network with whom user A of the communications network wants to build or enhance a relationship. The method may also include receiving an identification of an existing relationship that user A wants to use as a model for building or enhancing the relationship with user C. The method may additionally include developing the model for building or enhancing the relationship with user C based on the existing relationship. The method may further include using the model for building or enhancing the relationship between user A and user C.

In some other embodiments of the present invention and in combination with any of the above embodiments, receiving the identification of the existing relationship that user A wants to use as the model may include receiving an identification of user B. The model for building or enhancing the relationship between user A and user C may include the relationship between user A and user B. An advantage of this feature is that the model for building or enhancing the relationship is based on an existing known relationship that is successful or at least corresponds or correlates to the level of interactions and the types of interactions that user A would like to have with user C and provides guidance or a benchmark for achieving a similar relationship with user C.

In some embodiments of the present invention and in combination with any of the above embodiments, receiving the identification of the existing relationship that user A wants to use as the model may include receiving the identification of another pair of users of the communications network. The model for building or enhancing the relationship between user A and user C may then include the relationship between the other pair of users. In this embodiment, the existing relationship for the model does not have to be a relationship between user A and some other user of the communications network but may be a relationship between any pair of users that user A selects. An advantage of this feature is that the model for building or enhancing the relationship is based on an existing relationship that user A wants to use as a model for the level of interactions and the types of interactions that user A wants to develop with user C and provides a guide for achieving a similar relationship with user C.

In some other embodiments of the present invention and in combination with any of the above embodiments, developing the model may include developing a desired relationship profile. Developing the desired relationship profile may include analyzing a set of interactions between a pair of users of the communications network chosen for the model. These features have the advantage of providing a mechanism or procedure for developing the model for the relationship user A desires to develop with user C that is based on an existing successful relationship chosen by user A as the model. The interactions are then analyzed to develop the desired relationship profile for the relationship user A wants to build or enhance.

In some other embodiments of the present invention and in combination with any of the above embodiments, analyzing the set of interactions between the users chosen for the model may include determining a pattern of communications between the pair of users. Determining the pattern of communications may include determining a frequency of communications between the pair of users using different types of communications media and/or determining a frequency of use of a set of predetermined websites. An advantage of these features is providing an appropriate type of interactions and level of frequency of the different types of interactions in the model for building or enhancing a relationship between users.

In some other embodiments of the present invention and in combination with any of the above embodiments, the method for building or enhancing a relationship between user A and user C may include setting a target for a level of interaction between user A and user C based on the relationship profile. This feature has the advantage of setting appropriate types of interactions and levels of frequency of interactions between the users for building or enhancing the relationship.

In some other embodiments of the present invention and in combination with any of the above embodiments, the method for building or enhancing a relationship between user A and user C may include generating a prompt or suggestion to facilitate building the relationship between user A and user C in response to the level of interaction between user A and user C falling below the target for a particular type of interaction. An advantage of this feature is that use A will be automatically reminded with regard to interactions with user C for building or enhancing the relationship if targets corresponding to the model or desired relationship profile are not being met.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1A:
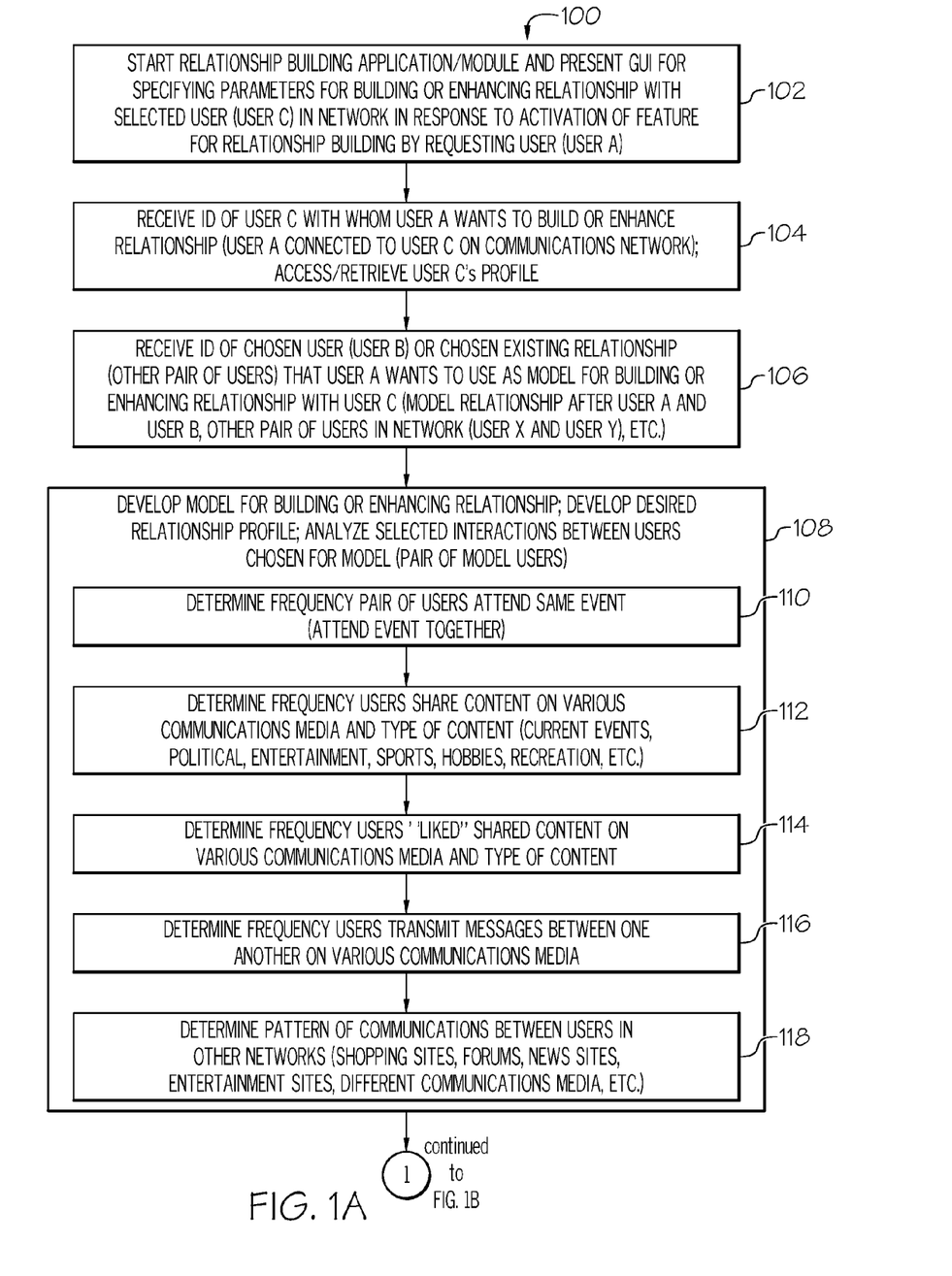
FIGS. 1A-1B (collectively FIG. 1) are a flow chart of an example of a method for building or enhancing a relationship in accordance with an embodiment of the present invention.
Figure 1B:
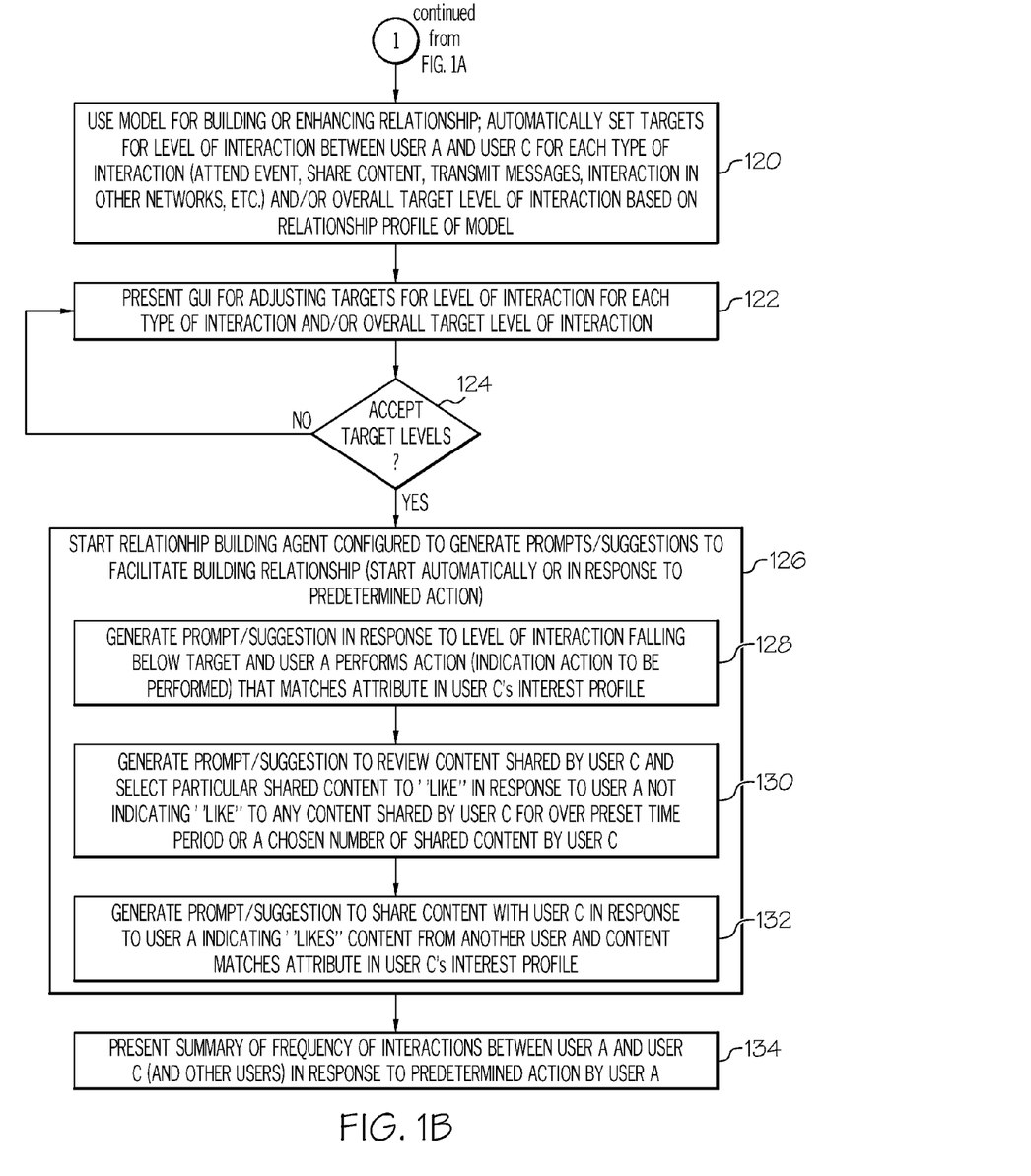

FIGS. 1A-1B (collectively FIG. 1) are a flow chart of an example of a method 100 for building or enhancing a relationship in accordance with an embodiment of the present invention. In block 102, a relationship building or enhancing application or module may be started in response to activation of a feature for relationship building or enhancing by a requesting user or user A of a communications network. The feature may be an icon, an item in a drop down menu or any other feature that may be presented on a screen of a computer device or system that permits user A or a user requesting to build or enhance a relationship with another user of the communications system as described in more detail herein. The user of the communications system that is requesting to build or enhance a relationship with another user of the communications system may be referred to herein as the requesting user or user A. The other user selected by the requesting user or user A with whom the requesting user desires to build or enhance the relationship may be referred to herein as the selected user or user C. User A is connected to user C on the communications network and interaction between user A and user C may have previously occurred via the communications network. However, user A desired to build or enhance the relationship with user C comparable to another relationship that may be used as a model for building or enhancing the relationship between user A and user C. As described herein the relationship may include other types of interactions in addition to interactions via the communications network. Example of interactions of the relationship may include, but is not necessarily limited to, attending the same event or face-to-face meetings, sharing content via various communications networks or media, telephone calls, text messaging, patterns of communications between users in other networks or communications media or other types of interactions between the users. The communications network may be a social network or any type of online communications medium, network or system.

Figure 2:
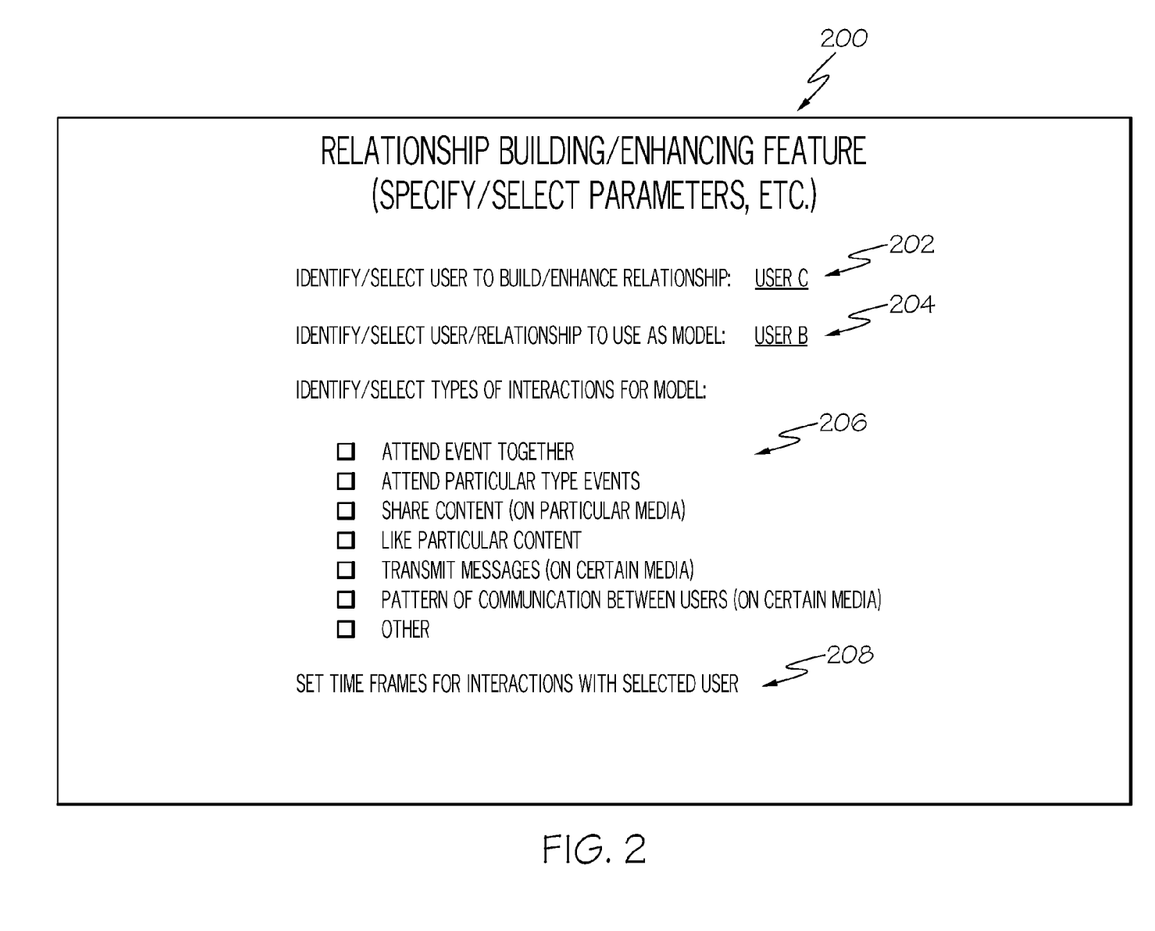
FIG. 2 is an example of a graphical user interface (GUI) for specifying or selecting parameters for building or enhancing a relationship in accordance with an embodiment of the present invention.

In addition to starting the relationship building application or module in response to activation of the feature for relationship building by user A in block 102, a graphical user interface (GUI) may be presented for specifying parameters by user A or the requesting user for building or enhancing the relationship with the selected user or user C. Referring also to FIG. 2, FIG. 2 is an example of a GUI 200 for specifying or selecting parameters for building or enhancing a relationship in accordance with an embodiment of the present invention.

In block 104, an identification of user C with whom user A wants to build or enhance a relationship may be received. User A may identify or select user C by using the GUI 200. User A may enter or select user C in a field 202 for identifying or selecting the user with whom user A desires to build or enhance the relationship. A profile or interest profile of user C may be accessed or retrieved in response to user A selecting user C as the user with whom user A is requesting or desiring to build or enhance the relationship. The profile or interest profile of user C may include a plurality of attributes that may be compared or matched to interests of user A for building or enhancing the relationship between user A and user C. Examples of the attributes may include, by not necessarily limited to, likes and dislikes of user C, such as activities or events user C enjoys or likes to attend, foods user C likes and dislikes and other interests.

In block 106, an identification of an existing relationship that user A wants to use as a model for building or enhancing the relationship with user C may be received. In accordance with an embodiment, the identification of the existing relationship that user A wants to use as the model for building or enhancing the relationship with user C may include choosing a user with whom user A already has a successful relationship. Accordingly, an identification of a chosen user or user B with whom user A already has a successful relationship may be received. The model for building or enhancing the relationship between user A and user C may then include the relationship between user A and user B. An advantage of this embodiment is that the model for building or enhancing the relationship is based on an existing known relationship that is successful or at least corresponds or correlates to the level of interaction and the types of interactions that user A would like to have with user C and provides guidance or a benchmark for achieving a similar relationship with user C.

User A may enter or select the user or relationship in field 204 of GUI 200 in FIG. 2 to identify or select the user or relationship that user A wants to use as the model for building or enhancing the relationship with user C.

In accordance with another embodiment, the identification of the existing relationship that user A wants to use as the model may include receiving the identification of another pair of users of the communications network, for example, user X and user Y. Accordingly, the model for building or enhancing the relationship between user A and user C may include the relationship between the other pair of users, user X and user Y, that is not a relationship between user A and some other user of the communications network, such as user B. The advantage of this embodiment is that user A may view the relationship between some other pair of users in the communications network as corresponding or correlating more closely to the relationship that user A wants to build or enhance with user C rather than any relationship user A may currently have with another user of the communications network.

User A may enter or select the relationship between user X and user Y to be used as the model for building or enhancing the relationship between user A and user C by entering user X and user Y in the field 204 in the GUI 200.

In block 108, a model for building or enhancing a relationship between user A and user C may be developed based on the existing relationship chosen by user A as the model. Developing the model for building or enhancing the relationship between user A and user C may include developing a desired relationship profile. The desired relationship profile may be developed by analyzing a set of interactions between the pair of users of the relationship chosen for the model. The pair of users chosen for the model may also be referred to as the model users or pair of model users. Blocks 110-118 within block 108 are examples of interactions and analysis of the interactions between a pair of model users that may be used for developing a desired relationship profile for a model for building or enhancing a relationship. The exemplary interactions and analysis of the interactions may include but is not necessarily limited to the interactions and analysis represented in blocks 110-118. Additionally, not all the exemplary interactions in blocks 110-118 and analysis described with reference to blocks 110-118 would necessarily have to be utilized for developing the model in block 108.

The different interactions between the model users for use in the model may be specified or selected by user A. For example, the GUI 200 may present a plurality of types of interactions 206 between the model users that may be selected or identified for being used for the model. In accordance with another embodiment, any interactions between the model users may be used in the model.

In block 110, a frequency that the pair of users of the model attended the same event or attended an event together may be determined. The types of events attended may also be tracked or monitored. The frequency of attending the same events or attending events together may be determined by analyzing an electronic calendar of the pair of users of the model and/or analyzing communications between the users that may mention events and attending certain events.

In block 112, a frequency of the pair users of the model sharing content on various communications media and the type of content may be determined. Examples of the different types of content that may be shared by the model users may include, but is not necessarily limited to, current events, political content, entertainment, sports, hobbies, recreational activities or other content that may be shared between the model users. Examples of different communications media may include, but is not necessarily limited to, e-mail, text messaging, Twitter, Facebook, telecommunications or other communications media. Twitter is a trademark of Twitter, Inc. in the United States, other countries or both. Facebook is a trademark of Facebook, Inc. in the United States other countries or both.

In block 114, a frequency that the pair of users of the model indicated a "like" or other emotion or comment related to shared content on various communications media and type of content shared may be determined or analyzed. The type of emotion or comment expressed, the particular media used and other characteristics of the shared content in addition to the type or subject matter of the content may be analyzed. Natural language processing or other text processing may be used to analyze the shared content.

In block 116, a frequency that the pair of users of the model transmits messages between one another on the various communications media may be determined or analyzed. For example, a frequency that the pair of users transmits messages on each of the various types of communications media may be tracked or monitored and the subject matter of the messages may be analyzed. The subject matter of the messages may be analyzed by using natural language processing or other text processing or analysis program to determine the subject matter of a particular message or conversation thread.

In block 118, a pattern of communications between the pair of users of the model in other networks or systems may be determined. Examples of patterns of communications may include, but is not necessarily limited to, a frequency of use of a particular communications network, transmitting a certain type of content over a particular communications network with a certain amount of frequency, or other patterns of communications. Examples of other networks or systems may include, but are not necessarily limited to shopping websites, forums, news websites, entertainment websites, information research websites or other websites that may be accessed on a regular or routine basis by each of the pair of model users.

Referring also the FIG. 2, the GUI 200 for specifying or selecting parameters for building or enhancing a relationship may include a feature or features 206 for identifying or selecting types of interactions between the model users that may be analyzed and used for developing the model. The types of interactions may be similar to those discussed with reference to blocks 110-118 but may also include additional or different interactions than those indicated in FIG. 2 or blocks 110-118. The GUI 200 may also include a feature 208 for setting a time frame or frequency level for each of the interactions or selected interactions of the model to occur between the requesting user or user A and the selected user or user C with whom user A desires to build or enhance the relationship.

In block 120, the model developed in block 108 may be used for building or enhancing the relationship between the requesting user or user A and the selected user or user C. Targets may be set for a level of interaction between user A and user C for each type of interaction and/or an overall target level of interaction may be set based on the desired relationship profile of the model. The target levels for interaction may be set automatically based on the desired relationship profile of the model. Similar to that previously described, examples of interaction may include, but are not necessarily limited to attending an event, sharing content, transmitting messages to one another, interactions in other networks or other interactions.

Figure 3:
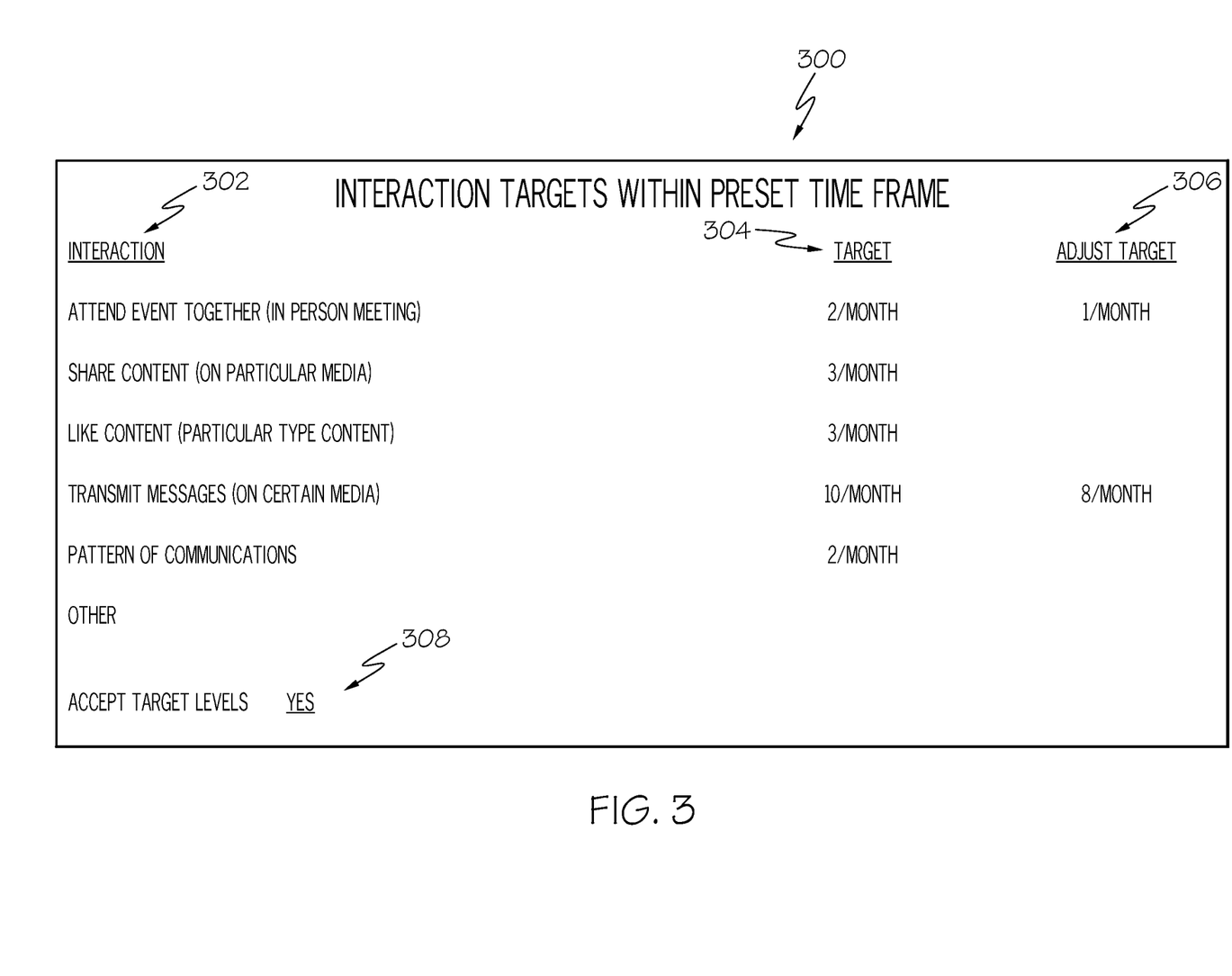
FIG. 3 is an example of a GUI for presenting interaction targets for building or enhancing a relationship in accordance with an embodiment of the present invention.

In block 122, a GUI may be presented for adjusting targets for the level of interaction for each type of interaction and/or an overall target level of interaction. Referring also to FIG. 3, FIG. 3 is an example of a GUI 300 for presenting interaction targets for building or enhancing a relationship in accordance with an embodiment of the present invention. The GUI 300 may list each type of interaction 302 in a first column that may be labelled "INTERACTION". The target 304 for the level of interaction associated with each type of interaction 302 may be presented in a second column that may be labelled "TARGET". A time frame or frequency level associated with each target 304 may also be presented. For example, a target and time frame for the interaction of "attend an event together" or an in person meeting may be two occurrences per month. The GUI 300 may also include a feature 306 for adjusting the target and time frame or frequency level. Accordingly, user A or the requesting user that is using the tool to build or enhance the relationship with another user may adjust the target and frequency level for a particular interaction or occurrences of the particular interactions. As illustrated in the example of FIG. 3, the target for the interaction "attend event together" or an in person meeting has been adjusted by the user to one per month. The feature 306 for adjusting the target and time frame may include permitting the user to enter another value in a third column labelled "ADJUST TARGET" in a row corresponding to the particular interaction 302 in the first column.

Referring back to FIG. 1B, in block 124, a determination may be made if the target levels have been accepted. The GUI 300 may include a feature 308 for the user to indicate acceptance of the targets and time frame associated with each target. If the target levels are not acceptable, the method 100 may return to block 122. If the target levels are accepted by the use, the method 100 may advance to block 126.

In block 126, a relationship building agent may be started to facilitate building or enhancing the relationship between user A and user C based on the model. The relationship building agent may be configured to generate prompts or suggestions which may be presented to user A to facilitate building or enhancing the relationship between user A and user C. The relationship building agent may be started automatically in response to a predetermined action. For example, the relationship building agent may be started in response to user A accepting the target levels in block 124 or indicating acceptance of the target levels using feature 308 in GUI 300.

Examples of prompts or suggestions that may be presented to user A to facilitate building or enhancing the relationship with user C will described with reference to blocks 128-132. The present invention is not intended to be limited by the examples described in blocks 128-132 and the relationship building agent may be configured to generate and present to user A any sort of prompt or suggestion that may facilitate building or enhancing the relationship with user C.

In block 128, a prompt or suggestion may be generated and presented to user A in response to a level of interaction falling below the associated target and the user performs a particular action associated with the target or there is an indication that user A will be performing a particular action associated with the target. The particular action may also match an attribute in user C's interest profile, such as user C likes to attend certain events. As an example, a determination may be made that user A will be attending a particular event and the number of interactions for attending an event with user C is below the target or below the target for the preset time frame or frequency level. A prompt or suggestion may be generated by the relationship building agent and presented to user A that this type of interaction between user A and user C is below target and user C likes to attend this type of event. The relationship building agent could even suggest that user A invite user C to attend the event.

In block 130, a prompt or suggestion may be generated and presented to user A to review content shared by user C and to select a particular shared content from user C to "like" in response to user A not having indicated liking any content shared by user C over a preset time period, or chosen number of pieces of content shared by user C which was specified as a target for this particular type interaction.

In block 132, a prompt or suggesting may be generated and presented to user A to share content with user C in response to user A indicating liking content from another user and the content matches an attribute in user C's interest profile that user C has an interest in similar content. In addition, the prompt or suggestion may also be presented in response to user A being below the target for this type of interaction for the preset time period or time frame for meeting the target for the particular interaction.

The feature of the relationship building agent which is configured to generate and present prompts or suggestions to user A to facilitate building or enhancing the relationship with user C has the advantage of prompting or suggesting the appropriate interactions between the users and that the level of interaction between user A and user C has the appropriate frequency based on the model. The relationship building agent as described herein solves the technical problem of effectively and efficiently providing the appropriate interactions and level of frequency of different interactions for building or enhancing a relationship between users.

In block 134, a summary of frequency of interaction between user A and user C may be presented to user A in response to a predetermined action by user A. An example of the predetermined action may be the user activating a feature in a GUI presented by the relationship building application or module that causes the summary to be provided. In another embodiment, the summary may be automatically presented each time an interaction between user A and user C occurs or in response to some other predetermined action.

Figure 4:
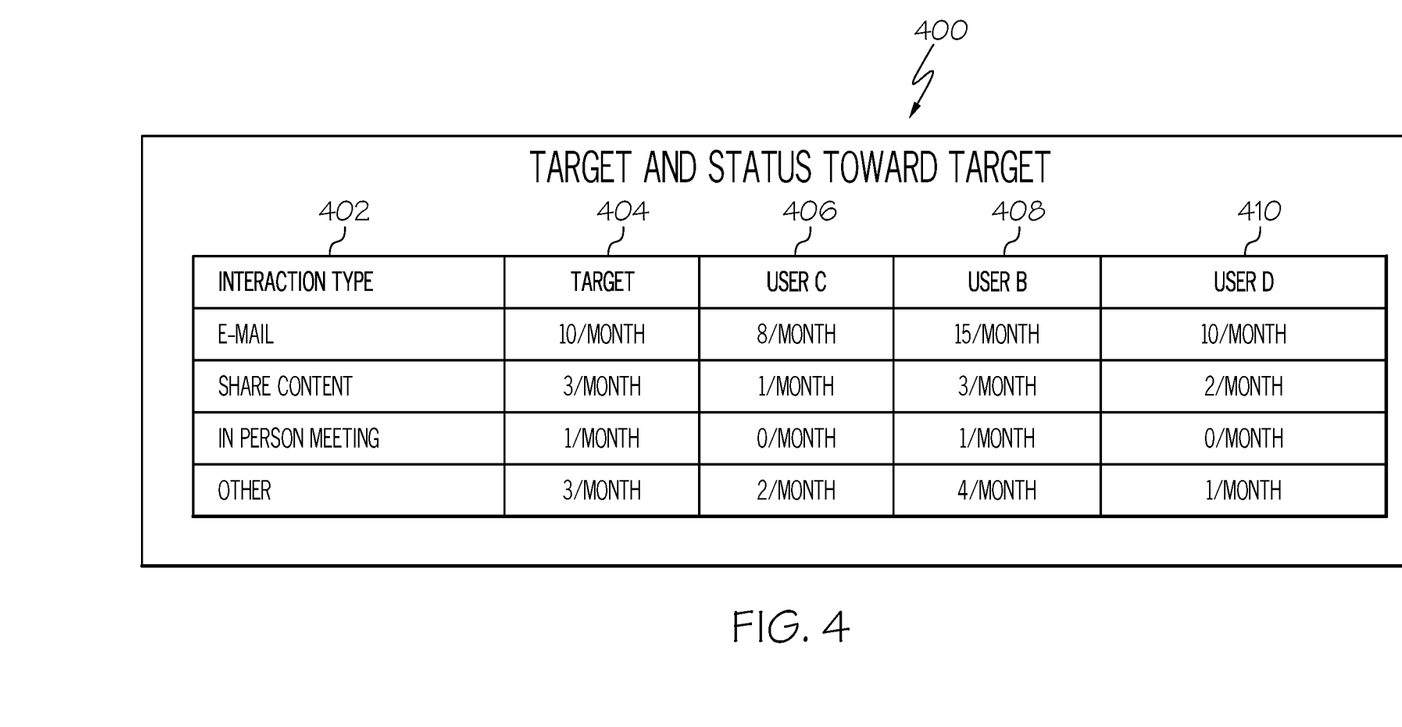
FIG. 4 is an example of a GUI for presenting target and status toward target information in accordance with an embodiment of the present invention.

Referring also to FIG. 4, FIG. 4 is an example of a GUI 400 for presenting target and status toward target information for building or enhancing a relationship in accordance with an embodiment of the present invention. The GUI 400 may include a first column that includes a listing of the different types of interactions 402 between users. The list of interactions may be interactions specified in block 108 in FIG. 1A and/or GUI 200 in FIG. 2. A second column may include the target 404 associated with each of the interactions 402 listed in the first column A third column may include a number of interactions per a preset time period between user A and user C 406, with whom user A is building or enhancing the relationship, for each type of interaction 402 in the first column. The GUI 400 may also include other columns 408, 410 with statistics of interactions between user A and other users for each of the different types of interactions 402 in the first column. For example, one of the other users may be user B selected by user A for the relationship between user A and user B to be used for the model for building or enhancing the relationship between user A and user C. An advantage of this feature is that user A can compare the frequency of interactions for different types of interactions with the target and with user C as well as other users to determine a status or progress toward building or enhancing the relationship with user C compared to the target and other users. The summary also provides an indication that the appropriate interactions and appropriate frequency of each interaction is being used to build or enhance the relationship with user C.

As evident from the preceding description, the relationship building application or module represents an improvement in technology by providing a model for building or enhancing a relationship between users. The relationship used for the model may be specified by the requesting user or user A by selecting another user or user B whose relationship with user A is used as the model for building or enhancing the relationship with user C. The model includes a desired relationship profile that may include a target number of interactions for each type of interaction in the model or desired relationship profile. The targets may be adjusted by the user as previously described. Prompts or suggestions may be presented to user A for meeting the targets or in response to a particular type of interaction falling below the target. Accordingly, these features provide a technical solution for overcoming the problems of determining the appropriate type of interactions, over what communications media, and with what frequency of the different types of interactions for building or enhancing a relationship by one user with another user.

Figure 5:
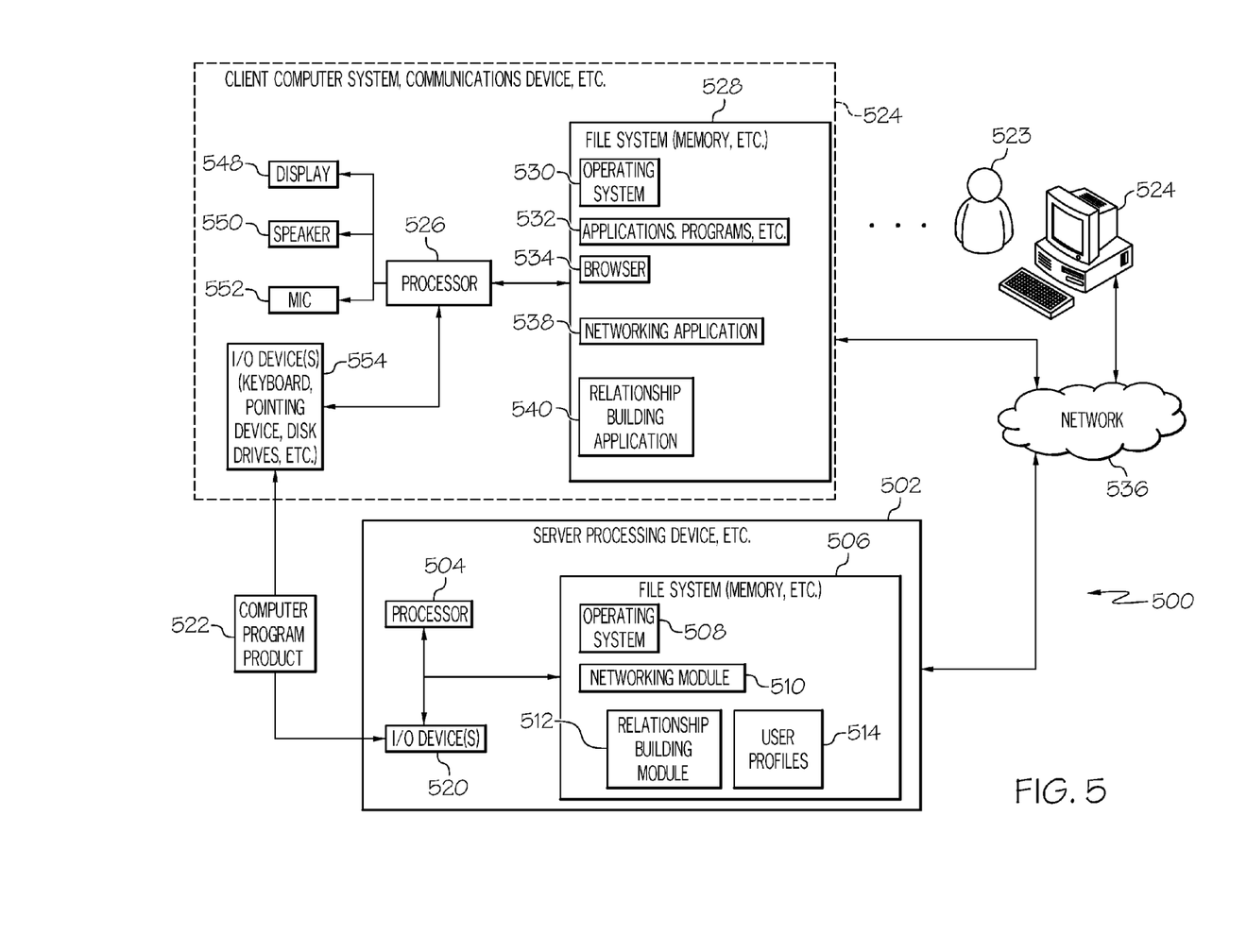
FIG. 5 is a block schematic diagram of an example of a system for building or enhancing a relationship in accordance with an embodiment of the present invention.

FIG. 5 is a block schematic diagram of an example of a system 500 for building or enhancing a relationship in accordance with an embodiment of the present invention. The method 100 of FIGS. 1A-1B may be embodied in and performed by the system 500. The system 500 may include a processing device 502. The processing device 502 may be a server or similar processing device. The processing device 502 may include a processor 504 for controlling operation of the processing device 502 and for performing functions, such as those described herein with respect to building or enhancing a relationship between users. The processing device 502 may also include a file system 506 or memory. An operating system 508, applications and other programs may be stored on the file system 506 for running or operating on the processor 504. A networking module 510 or system may also be stored on the file system 506 and may be compiled and run on the processor 504 to perform the functions for building or enhancing a relationship between users similar to that described herein. The networking module 510 may be any type of online communications mechanism for online communications or conversations.

A relationship building module 512 or system may also be stored on the file system 506. The method 100 of FIGS. 1A-1B may be embodied in the networking relationship building module 512 and may be performed by the processor 504 when the relationship building module 510 is compiled and run on the processor 504. The relationship building module 512 may operate in association with the networking module 510 and other types of communications media to perform the functions and operations associated with the method 100. In another embodiment, the relationship building feature 512 may be a component of the networking module 510 and may operate in association with the networking module 510 and other communications media.

A database of user profiles 514 or user interest profiles may also be stored on the file system 560. The database of user profiles 514 may be use by the relationship building module 512 to identify interests for interactions between users in building or enhancing relationships similar to that described herein. In another embodiment, the user profiles 514 may be a component of the networking module 510.

The processing device 502 may also include one or more input devices, output devices or combination input/output devices, collectively I/O devices 520. The I/O devices 520 may include, but are not necessarily limited to, a keyboard or keypad, pointing device, such as a mouse, disk drive and any other devices to permit a user to interface with and control operation of the processing device 502 and to access the social networking module 510 or system. At least one of the I/O devices 520 may be a device to read a computer program product, such as computer program product 522. The computer program product 522 may be similar to that described in more detail herein. The networking module 510 and the relationship building feature 512 may be loaded on the file system 506 from a computer program product, such as computer program product 522.

A member of a network, such as a social network, or user 523 of the system 500 may use a computer system 524 or communications device to access the processing device 502 or server, networking module 510 or system and relationship building module 512. The computer system 524 or communications device may be any sort of communications device including a mobile or handheld computer or communications device. The computer system 524 may include a processor 526 to control operation of the computer system 524 and a file system 528, memory or similar data storage device. An operating system 530, applications 532 and other programs may be stored on the file system 528 for running or operating on the processor 526. A web or Internet browser 534 may also be stored on the file system 528 for accessing the processing device 502 or server via a network 536. The network 536 may be the Internet, an intranet or other private or proprietary network.

A networking application 538 for may also be stored on the file system 528 and operate on the processor 526 of the user's computer system 524.

In accordance with an embodiment, a relationship building application 540 may also be stored on the file system 538. The method 100 in FIGS. 1A and 1B, or at least portions of the method 100, may be embodied and performed by the relationship building application 540. In accordance with another embodiment, the relationship building application 540 may be part of the networking application 538.

The relationship building application 540 operating on the computer system 524 may interface with or operate in conjunction with the relationship building module 512 on the processing device 502 or server to perform the functions and operations described herein for building or enhancing a relationship between users. Accordingly, relationship building feature 540 operating on the computer system 524 may perform some of the functions and operations of the method 100 and relationship building feature or module 512 operating on the server 502 may perform other functions of the method 100. Some embodiments of the present invention may include only the relationship building module 512 operating on the processing device 502 or server, and other embodiments may include only the relationship building application 540 operating on the client computer system 524 or communications device.

The client computer system 524 may also include a display 448, a speaker system 550, and a microphone 552 for voice communications. One or more user interfaces may be presented on the display 548 for controlling operation of the relationship building module 512 and/or relationship building application 540 and for performing the operations and functions described herein.

The computer system 524 may also include one or more input devices, output devices or combination input/output devices, collectively I/O devices 554. The I/O devices 554 may include a keyboard or keypad, pointing device, such as a mouse, disk drives and any other devices to permit a user, such as user 523, to interface with and control operation of the computer system 524 and to access the relationship building application 540 and/or relationship building module 512 on server 502. The I/O devices 554 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for enhancing a relationship between user A and user C, comprising:
    receiving, by a processor, an identification of user C of a communications network with whom user A of the communications network wants to enhance a relationship;
    receiving, by the processor, an identification of an existing relationship selected by user A to use as a model for enhancing the relationship with user C;
    developing, by the processor, the model for enhancing the relationship with user C based on the existing relationship selected by user A;
    using, by the processor, the model for enhancing the relationship between user A and user C;
    setting a target for a level of interaction between user A and user C based on the model;
    setting a time frame for meeting the target; and
    starting, by the processor, a relationship building agent for enhancing the relationship between user A and user C based on the model, wherein the relationship building agent is configured for providing appropriate interactions between user A and user C and a level of frequency of different interactions based on the model for enhancing the relationship between user A and user C, wherein providing the appropriate interactions and the level of frequency of different interactions to enhance the relationship between user A and user C comprises:
    automatically generating a suggestion for enhancing the relationship between user A and user C and presenting the suggestion to user A, by the relationship building agent, in response to the level of interaction falling below the target and there is a presence of an indication user A will be performing a particular action associated with the target for the level of interaction between user A and user C based on the model;
    automatically generating the suggestion for enhancing the relationship between user A and user C and presenting the suggestion to user A, by the relationship building agent, for user A to review content shared by user C and for user A to select a particular shared content of user C and to indicate that user A likes the particular shared content of user C in response to user A not having indicated liking shared content of user C for a preset time period or a chosen number of shared content by user C; and
    automatically generating the suggestion for enhancing the relationship between user A and user C and presenting the suggestion to user A, by the relationship building agent, for user A to share a certain content with user C in response to user A indicating that user A likes the certain content shared by another user and the certain content matches an attribute in a profile of user C.

2. The method of claim 1, wherein receiving the identification of the existing relationship that user A wants to use as the model comprises receiving an identification of user B, the model for enhancing the relationship between user A and user C comprising the relationship between user A and user B.

3. The method of claim 1, wherein receiving the identification of the existing relationship that user A wants to use as the model comprises receiving an identification of another pair of users of the communications network, the model for enhancing the relationship between user A and user C comprising the relationship between the other pair of users.

4. The method of claim 1, wherein developing the model comprises developing a desired relationship profile, developing the desired relationship profile comprising analyzing a set of interactions between a pair of users of the communications network chosen for the model.

5. The method of claim 4, wherein the pair of users chosen for the model comprise user A and another user of the communications network.

6. The method of claim 4, wherein analyzing the set of interactions comprises determining a pattern of communications between the pair of users.

7. The method of claim 6, wherein determining a pattern of communications comprises at least one of:
   determining a frequency of communications between the pair of users using different types of communications media; and
   determining a frequency of use of a set of predetermined web sites.

8. The method of claim 4, wherein analyzing the set of interactions comprises determining a frequency the pair of users attend a same event.

9. The method of claim 4, wherein analyzing the set of interactions comprises:
   determining a frequency the pair of users share content on various types of communications media;
   determining a type or subject matter of the shared content; and
   determining a frequency each of the pair of users transmitted an indication of liking the shared content.

10. The method of claim 4, further comprising automatically setting a target for a level of interaction between user A and user C for each type of interaction of the set of interactions based on the relationship profile.

11. The method of claim 10, further comprising presenting a GUI for adjusting the target for each type of interaction of the set of interactions.

12. The method of claim 10, further comprising generating a particular suggestion, by the relationship building agent, to facilitate enhancing the relationship between user A and user C in response to the level of interaction between user A and user C falling below the target for a particular type of interaction.

13. The method of claim 1, further comprising presenting a graphical user interface for specifying parameters for the model for enhancing the relationship between user A and user C.

14. The method of claim 13, wherein presenting the graphical user interface comprise presenting a plurality of different types of interactions that are selectable for being used for the model.

15. The method of claim 14, wherein presenting the graphical user interface comprises presenting a feature for setting a frequency level for each of the different types of interactions of the model.

16. The method of claim 14, further comprising automatically setting a target level for interaction for each type of interaction based on a relationship profile of the model.

* * * * *